(12) United States Patent  (10) Patent No.: US 12,491,651 B2
Sun  (45) Date of Patent: Dec. 9, 2025

(54) FOOD SLICING RACK (71) Applicant: Wei Sun, Guangdong (CN)

(72) Inventor: Wei Sun, Guangdong (CN)

( * ) Notice: Subject to any disclaimer, the term of this patent is extended or adjusted under 35 U.S.C. 154(b) by 0 days.

(21) Appl. No.: 19/090,369

(22) Filed: Mar. 25, 2025

(65) Prior Publication Data
US 2025/0319620 A1 Oct. 16, 2025

(30) Foreign Application Priority Data

Apr. 12, 2024 (CN) .......................... 202430203930.1

(51) Int. Cl.
B26B 29/06 (2006.01)
(52) U.S. Cl.
CPC .................. *B26B 29/063* (2013.01)
(58) Field of Classification Search
CPC .................................................... B26B 29/063
USPC .................................. 269/295, 87.2, 58, 55
See application file for complete search history.

(56) References Cited

U.S. PATENT DOCUMENTS

| 6,186,038 B1* | 2/2001 | Lastovich | B26D 3/30 269/54.5 |
| 7,422,201 B2* | 9/2008 | Pearl | A47J 47/005 269/302.1 |
| 2013/0043633 A1* | 2/2013 | Schmidt | A47J 47/005 269/290 |

FOREIGN PATENT DOCUMENTS

WO  WO-2022233975 A1 * 11/2022 ............ A47J 47/005

OTHER PUBLICATIONS

Ninaber Publication Nov. 10, 2022 retrieved translation from ESPACENET: https://worldwide.espacenet.com/patent/search/family/077412277/publication/WO2022233975A1?q=WO2022233975A1 (Year: 2022).*

* cited by examiner

*Primary Examiner* — Orlando E Aviles
*Assistant Examiner* — Christopher Soto (57) ABSTRACT The present disclosure relates to a food slicing rack. The food slicing rack includes at least one guiding face and a receiving face. Each of the at least one guiding face extends transversely and is configured to guide movement of a cutting tool. The receiving face extends transversely and is configured for placement of food. A height of the receiving face is lower than a height of the each of the at least one guiding face.

17 Claims, 13 Drawing Sheets

FOOD SLICING RACK

CROSS-REFERENCE TO RELATED APPLICATIONS

The present application claims the priority of the Chinese design application No. 2024302039301, filed on Apr. 12, 2024, contents of which are incorporated herein by its entireties.

FIELD

The present disclosure relates to the field of kitchen utensils, and particularly to a food slicing rack.

BACKGROUND

Existing food slicing racks generally use vertical cutting to slice food, and most food slicing racks on the market are made of materials such as bamboo, wood, stainless steel, and plastic. These food slicing racks are not as hard as cutting tools, and since the cutting tools use vertical cutting, a blade of the cutting tool comes into contact with the food slicing rack during cutting process. This can cause scratches on a surface of the food slicing rack, leading to wear and a generation of fine particles that can affect user experience. Additionally, these fine particles can adhere to food and enter human mouth, posing a risk of choking or injuring esophagus and digestive system.

SUMMARY

The present disclosure provides a food slicing rack. The food slicing rack includes at least one guiding face and a receiving face. Each of the at least one guiding face extends transversely and is configured to guide movement of a cutting tool. The receiving face extends transversely and is configured for placement of food. A height of the receiving face is lower than a height of the each of the at least one guiding face.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

REFERENCE NUMERALS IN THE DRAWINGS

1—frame; 10—positioning structure; 11—first support member; 12—second support member; 101—first positioning portion; 102—second positioning portion; 103—third positioning portion; 104—fourth positioning portion; 105—vertical groove; 1051—bottom end of the vertical groove; 1000—guiding face; 1001—height-limiting platform; 1002—guiding groove; 10000—lowest point of the guiding face;

2—receiving plate; 21—protruding portion; 201—receiving face; 202—debris collection groove; 2010—highest point of the receiving face;

3—support shaft; 31—first support shaft; 32—second support shaft; 33—first auxiliary shaft; 34—second auxiliary shaft; 311—first rotating portion; 321—second rotating portion;

4—magnetic member;

9—cutting tool; 91—tool body; 92—blade;

1*b*—frame; 2*b*—receiving plate; 20*b*—plate;

1*c*—frame; 2*c*—receiving plate; 11*c*—first support member; 12*c*—base; 13*c*—threaded column.

DETAILED DESCRIPTION

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Referring to FIGS. 1-11, the present disclosure provides a food slicing rack. The food slicing rack includes a frame 1 and a receiving plate 2. The frame 1 is arranged with at least one guiding face 1000 extending transversely. The guiding face 1000 is configured to guide movement of a cutting tool 9. Particularly, the guiding face 1000 is horizontally disposed. The receiving plate 2 is mounted on the frame 1. The receiving plate 2 has a receiving face 201 extending transversely. The receiving face 201 is an upper face of the receiving plate 2. Particularly, the receiving face 201 is horizontally disposed. A height of the receiving face 201 is lower than a height of the guiding face 1000. The receiving face 201 is configured for placement of food.

Figure 11:
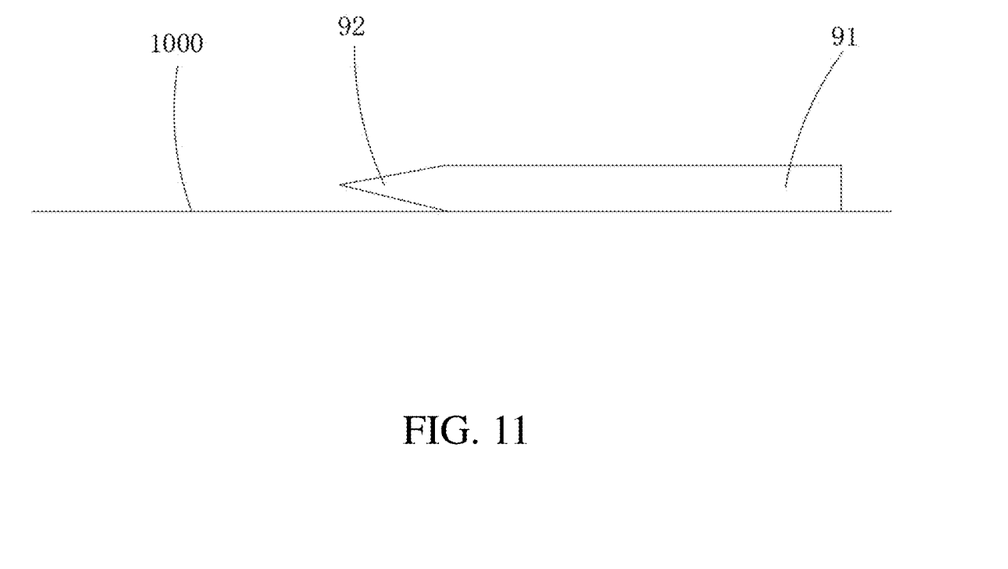
FIG. 11 is a schematic view of a relationship between the cutting tool and a guiding face in an embodiment of the present disclosure.

When the food is placed on the receiving face 201, a tool body 91 of the cutting tool 9 is placed on the guiding face 1000, and the cutting tool 9 is slid transversely along the guiding face 1000 to perform the slicing operation. Since the receiving face 201 is lower than the guiding face 1000, each cut of the cutting tool 9 results in food slices of uniform thickness, and the thickness of the food slices is the same as a height difference between the receiving face 201 and the guiding face 1000. As shown in FIG. 11, since a blade 92 of the cutting tool 9 is inherently thinner than the tool body 91, when the tool body 91 of the cutting tool 9 slides against the guiding face 1000, the blade 92 of the cutting tool 9 does not come into contact with the frame 1, thereby preventing the blade 92 from scratching the frame 1 and causing scratches or generation of fine particles on the frame 1.

It can be understood that, in general, the guiding face 1000 is parallel to the receiving face 201, ensuring uniform thickness of the sliced food. In some special cases, the guiding face 1000 is not parallel to the receiving face 201, for example, when the guiding face 1000 is slightly inclined relative to the receiving face 201, the thickness of the sliced food will not be uniform but gradually varying. These implementations should be included in the present disclosure, as long as a highest point 2010 of the receiving face 201 is lower than a lowest point 10000 of the guiding face 1000, to avoid the blade 92 of the cutting tool 9 coming into contact with the receiving face 201.

Figure 1:
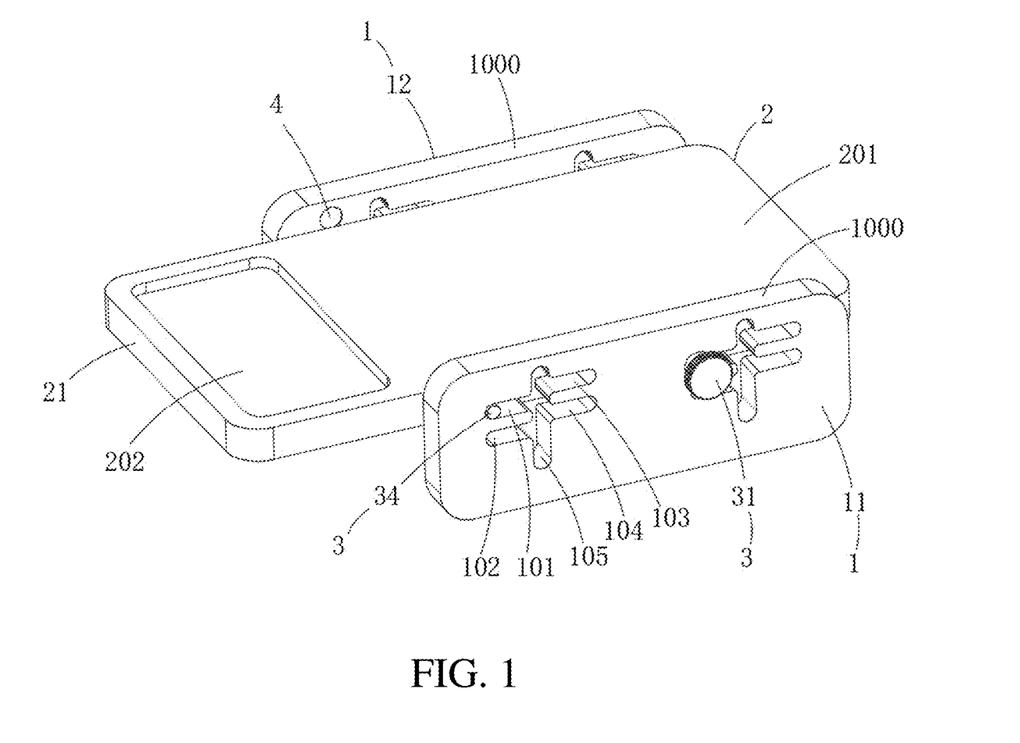
FIG. 1 is a schematic view of an overall structure of a food slicing rack according to an embodiment of the present disclosure.

To facilitate users to adjust the thickness of the food slices as needed, referring to FIG. 1, in some embodiments, the frame 1 has at least one first positioning portion 101 and at least one second positioning portion 102. A height of the first positioning portion 101 is different from a height of the second positioning portion 102. Each of the first positioning portion 101 and the second positioning portion 102 is located below the guiding face 1000. A distance from a center of the first positioning portion 101 to the guiding face 1000 is less than a distance from a center of the second positioning portion 102 to the guiding face 1000, which means that the first positioning portion 101 is higher than the second positioning portion 102. Each of the first positioning portion 101 and the second positioning portion 102 can be a hole, a groove, or other structure.

Figure 3:
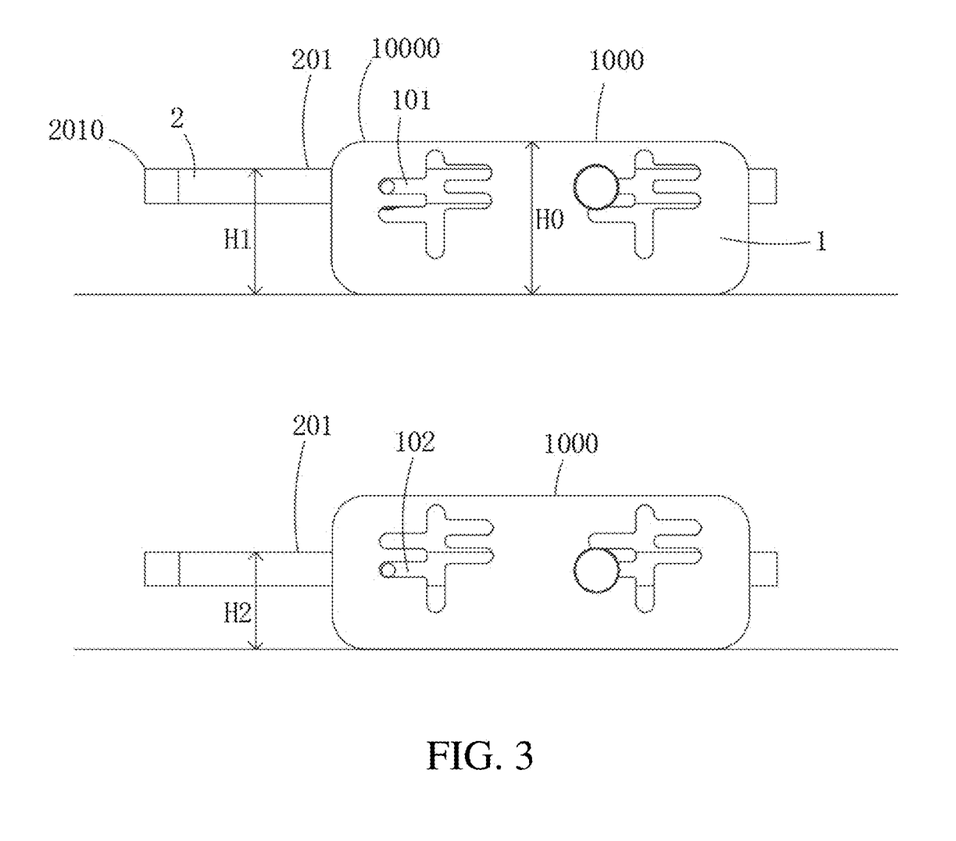
FIG. 3 is a schematic view I of a use state of the food slicing rack according to an embodiment of the present disclosure, showing a first height and a second height.

In some embodiments, the food slicing rack further includes at least one support shaft 3. Each of the at least one support shaft 3 is capable of being detachably mounted to the receiving plate 2 at the first positioning portion 101 or the second positioning portion 102. The receiving face 201 of the receiving plate 2 has a first height H1 corresponding to the first positioning portion 101, and the receiving face 201 of the receiving plate 2 has a second height H2 corresponding to the second positioning portion 102, and a height of the guiding face 1000 is H0. H0 is greater than H1, H1 is greater than H2, and as shown in FIG. 3, each height here, such as H1, H2, and H3 refers to a distance from a target face to a plane where the frame 1 is placed. That is, when the support shaft 3 is mounted at the first positioning portion 101, a height of the receiving face 201 is H1, and a thickness of the cut food is a height difference between H0 and H1. When the support shaft 3 is mounted at the second positioning portion 102, a height of the receiving face 201 is H2, and a thickness of the cut food is a height difference between H0 and H2.

Figure 4:
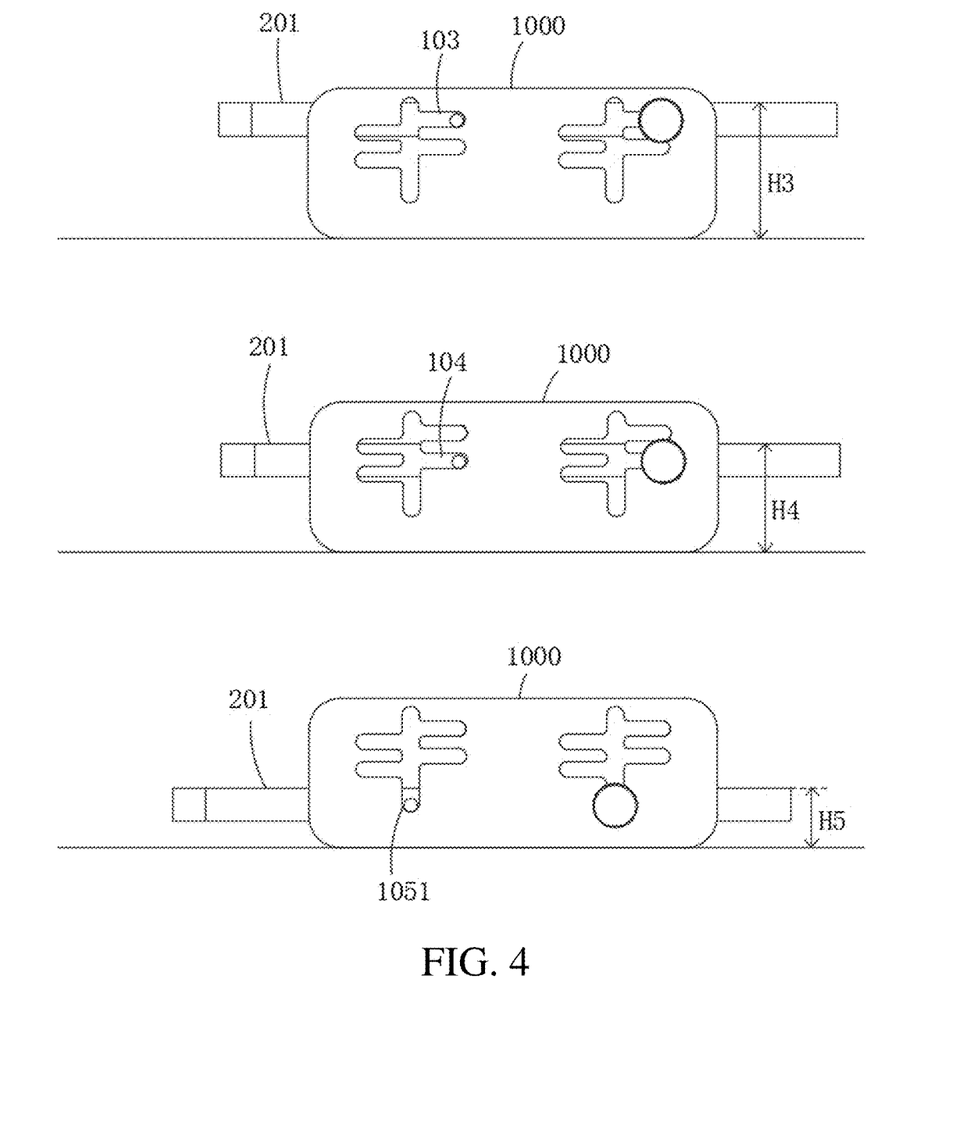
FIG. 4 is a schematic view II of the use state of the food slicing rack according to an embodiment of the present disclosure, showing a third height, a fourth height, and a fifth height.

To provide users with more options for slice thickness, in some embodiments, as shown in FIG. 4, the frame 1 may further has at least one third positioning portion 103 and at least one fourth positioning portion 104. A height of the third positioning portion 103 is different from a height of the fourth positioning portion 104. And each of the height of the third positioning portion 103 and the height of the fourth positioning portion 104 is different from the height of the first positioning portion 101 and the height of the second positioning portion 102. Or the frame 1 may further has even more positioning portions with a different height. The support shaft 3 is capable of being detachably mounted to the frame 1 at the third positioning portion 103, the fourth positioning portion 104, or other positioning portions. The receiving face 201 of the receiving plate 2 has a third height H3 corresponding to the third positioning portion 103 and a fourth height H4 corresponding to the fourth positioning portion 104, and the receiving face 201 can have other different heights corresponding to more other positioning portions. As shown in FIG. 4, each height here, such as H3 and H4 refers to a distance from a target face to a plane where the frame 1 is placed.

To facilitate users to adjust the height of the receiving face 201, in some embodiments, each of the first positioning portion 101, the second positioning portion 102, the third positioning portion 103, and the fourth positioning portion 104 is a groove penetrating the frame 1, and the support shaft 3 can penetrate the first positioning portion 101, the second positioning portion 102, the third positioning portion 103, or the fourth positioning portion 104 correspondingly, and the support shaft 3 can abut against the frame 1 at the first positioning portion 101, the second positioning portion 102, the third positioning portion 103, or the fourth positioning portion 104. A locking tool can be used to lock the support shaft 3 at a current positioning portion, maintaining the height of the receiving face 201 unchanged during a cutting process of the food.

To facilitate users to adjust a position of the support shaft 3 between different positioning portions, in some embodiments, the frame 1 further defines at least one vertical groove 105. The vertical groove 105 also penetrates the frame 1, allowing the support shaft 3 to pass through the vertical groove 105. Each of the first positioning portion 101, the second positioning portion 102, the third positioning portion 103, and the fourth positioning portion 104 extends transversely. The at least one vertical groove 105 extends vertically and is communicated with each of the first positioning portion 101, the second positioning portion 102, the third positioning portion 103, and the fourth positioning portion 104, allowing the support shaft 3 at any positioning portion to be transferred to other positioning portions through the vertical groove 105.

In addition, a height of a bottom end 1051 of each of at least one vertical groove 105 is less than a height of the second positioning portion 102, or even lower than a lowest positioning portion. The support shaft 3 can abut against the frame 1 at any position around the first positioning portion 101, at any position around the second positioning portion 102, at any position around the third positioning portion 103, at any position around the fourth positioning portion 104, or at the bottom end 1051 of the vertical groove 105. The receiving face 201 of the receiving plate 2 has a fifth height H5 corresponding to the bottom end 1051 of the vertical groove 105. That is, when the support shaft 3 abuts against the frame 1 at the bottom end 1051 of the vertical groove 105, the receiving face 201 has a fifth height H5, and H5 is the minimum height of the receiving face 201. Similarly, as shown in FIG. 4, H5 refers to a distance from a target face to a plane where the frame 1 is placed.

Figure 5:
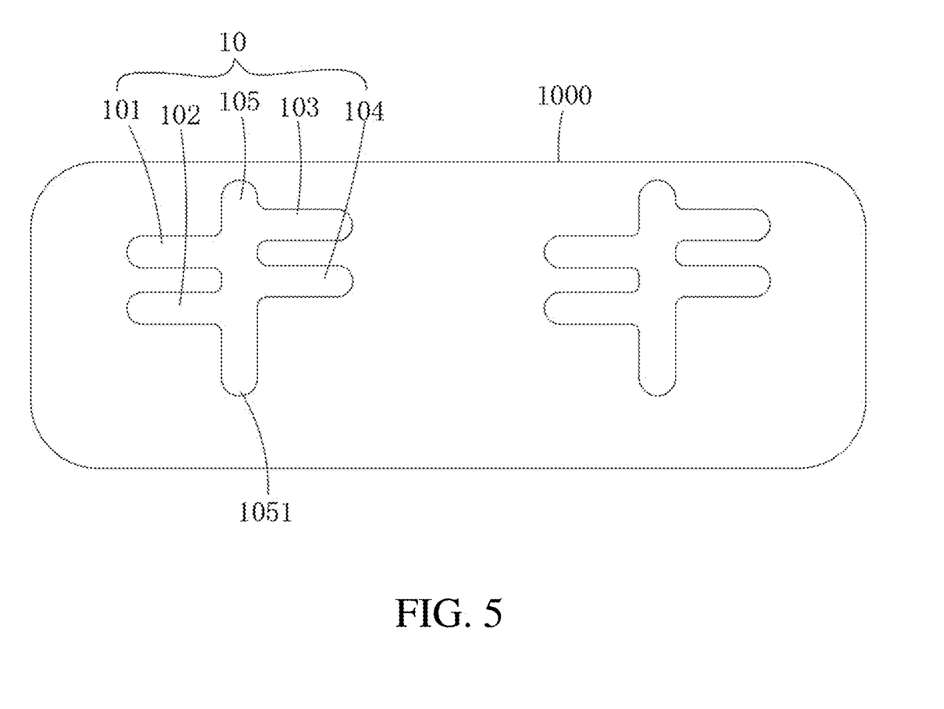
FIG. 5 is a structural view of a frame according to an embodiment of the present disclosure, showing a group of positioning structure including a first positioning portion, a second positioning portion, a third positioning portion, a fourth positioning portion, and a vertical groove.

In some embodiments, as shown in FIG. 5, each of the first positioning portion 101, the second positioning portion 102, the third positioning portion 103, and the fourth positioning portion 104 extends horizontally. An extension direction of the first positioning portion 101, an extension direction of the second positioning portion 102, an extension direction of the third positioning portion 103, and an extension direction of the fourth positioning portion 104 are parallel to each other. The number of the at least one vertical groove 105 is one.

Figure 6:
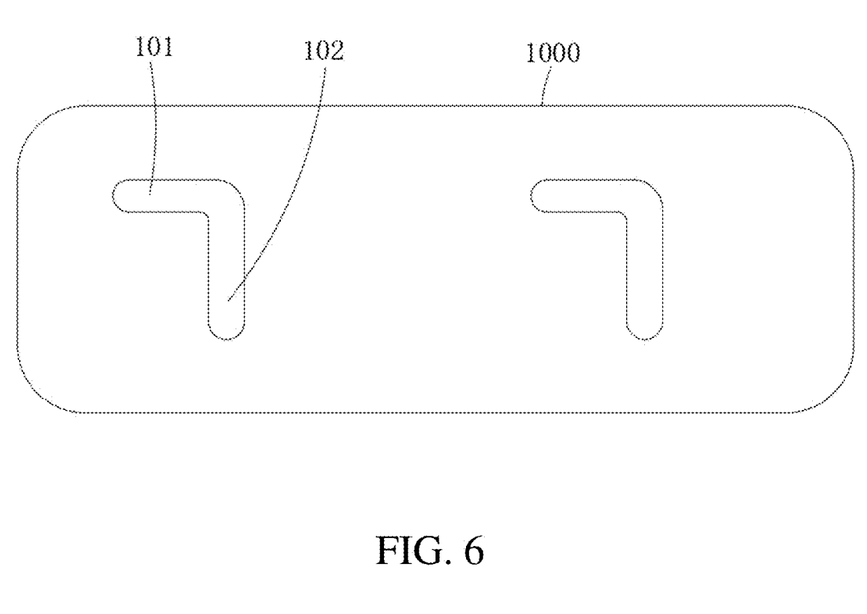
FIG. 6 is a structural view of the frame according to another embodiment of the present disclosure, showing a group of positioning structures including the first positioning portion and the second positioning portion.
Figure 7:
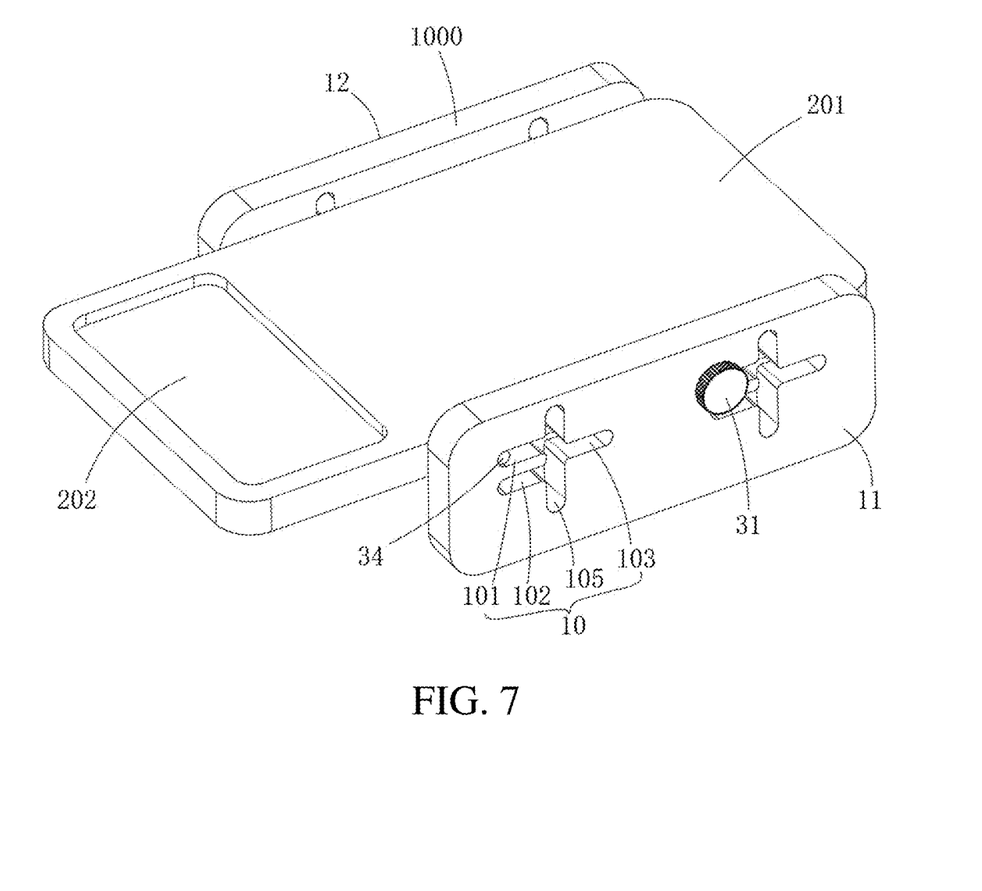
FIG. 7 is a schematic view of the overall structure of the food slicing rack according to a further embodiment, showing a group of positioning structure including the first positioning portion, the second positioning portion, the third positioning portion, and the vertical groove.

In other embodiments, as shown in FIG. 6, the frame 1 defines only the first positioning portion 101 and the second positioning portion 102, and each of the first positioning portion 101 and the second positioning portion 102 is a groove penetrating the frame 1. The first positioning portion 101 extends horizontally, the second positioning portion 102 extends vertically, and the first positioning portion 101 and the second positioning portion 102 are communicated with each other and is intersected with each other vertically. In some embodiments, each of the first positioning portion 101 and the second positioning portion 102 can be an inclined groove, and the two inclined grooves cooperatively form a diagonal line, which is not shown in the drawings.

To make connection between the receiving plate 2 and the frame 1 more stable, in some embodiments, the frame 1 has at least two groups of positioning structures 10, each of the at least two groups of positioning structures 10 at least includes one first positioning portion 101 and one second positioning portion 102. The number of the at least one support shaft 3 is at least two corresponding to the number of the at least two groups of positioning structures 10. The at least two support shafts 3 are spaced apart from each other and are arranged non-coaxially.

Specifically, the frame 1 includes a first support member 11 and a second support member 12. The receiving plate 2 is mounted between the first support member 11 and the second support member 12. In this way, the receiving plate 2 is evenly stressed on both sides, making installation of the receiving plate 2 more stable. The first support member 11 and the second support member 12 can be arranged separately from each other or integrally formed as a one-piece structure. In some embodiments, the first support member 11 and the second support member 12 are arranged separately from each other for easy position adjustment. At least one of the first support member 11 and the second support member 12 is arranged with a guiding face 1000. Particularly, each of the first support member 11 and the second support member 12 is arranged with a guiding face 1000, and the two guiding faces 1000 are at a same height and flush with each other. The receiving plate 2 is located between the two guiding faces 1000. That is, the tool body 91 of the cutting tool 9 can be placed on both the two guiding faces 1000 simultaneously, making the movement of the cutting tool 9 more stable.

In other embodiments, a sliding cutting tool can be mounted on the frame 1, and the sliding cutting tool is a cutting tool that comes with the food slicing rack.

Figure 8:
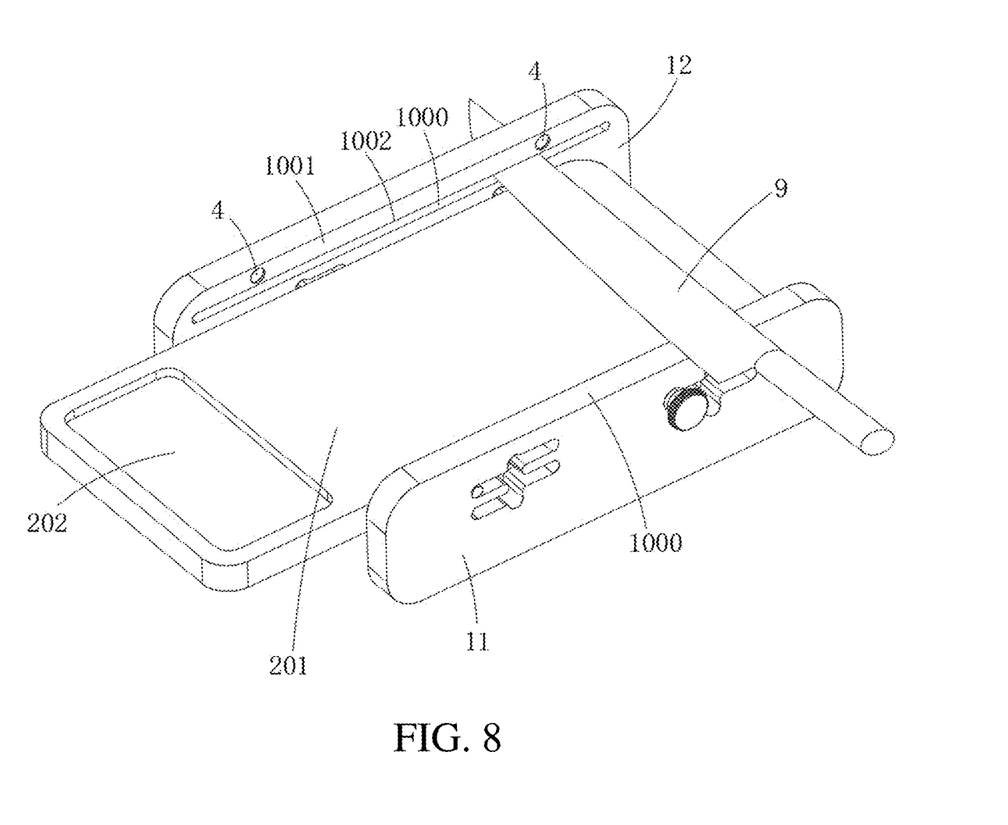
FIG. 8 is a schematic view I of the use state of the food slicing rack according to a further another embodiment of the present disclosure, showing a tip of a cutting tool passing through a guiding groove.
Figure 9:
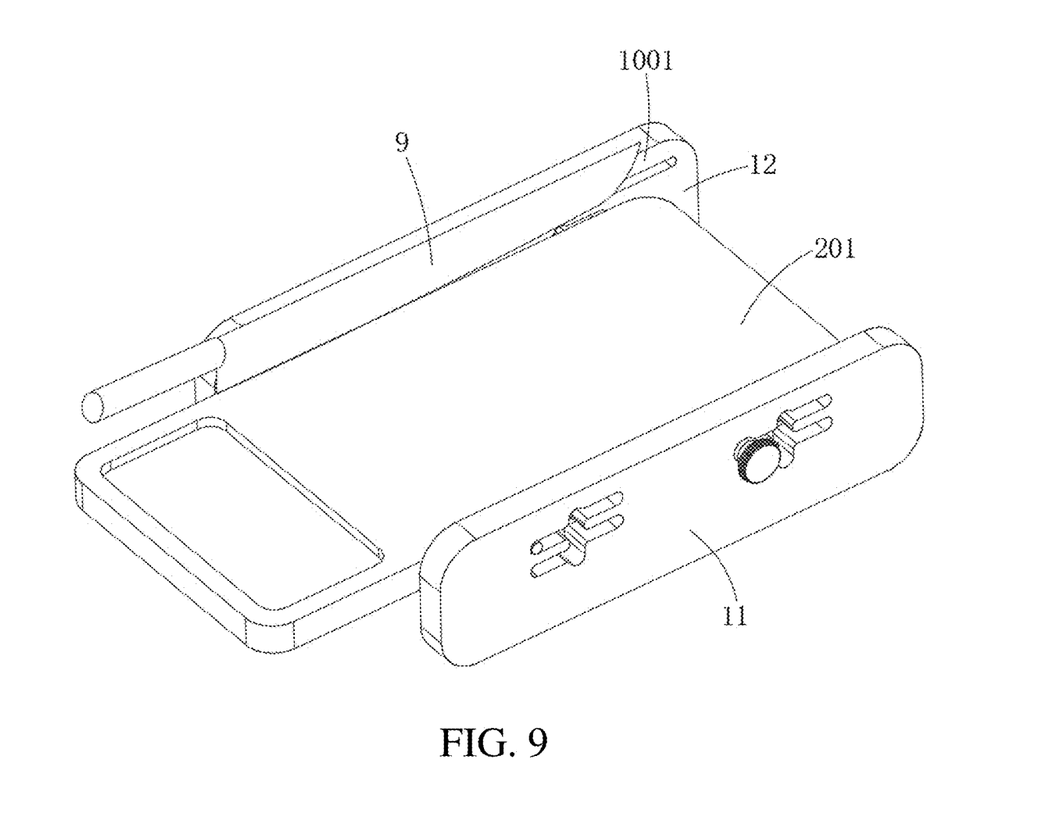
FIG. 9 is a schematic view II of the use state of the food slicing rack according to a further another embodiment of the present disclosure, showing the cutting tool being adsorbed and stored on a second support member.
Figure 10:
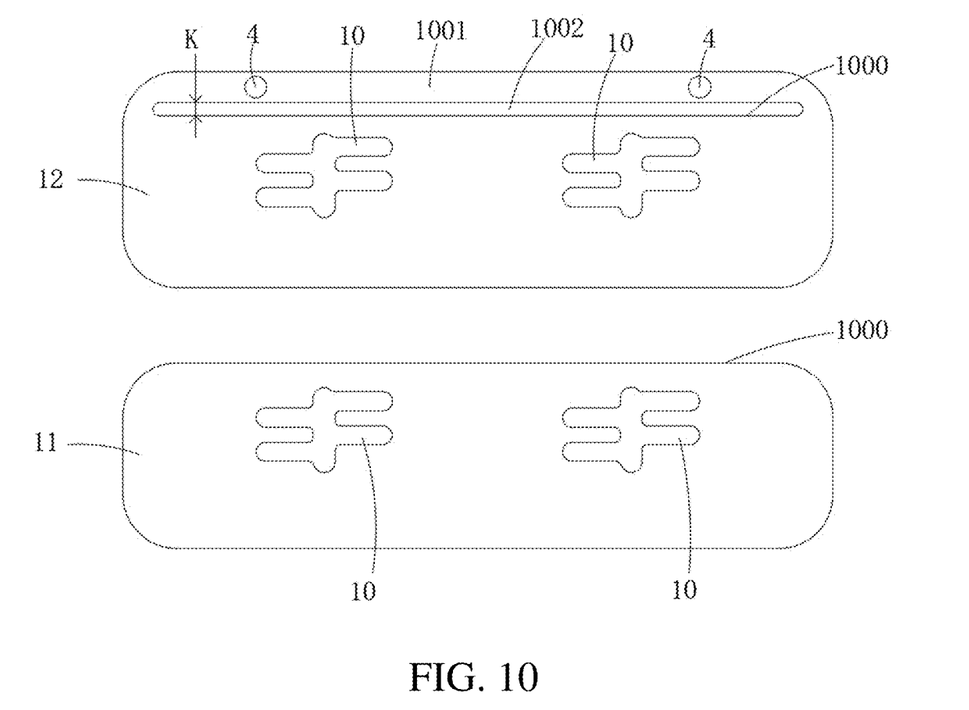
FIG. 10 is a structural view of a first support member and the second support member of according to a further another embodiment of the present disclosure.

As shown in FIGS. 8 and 10, the second support member 12 is arranged with a height-limiting platform 1001 at the guiding face 1000, and the height-limiting platform 1001 extends transversely. The height-limiting platform 1001 and the guiding face 1000 on the second support member 12 cooperatively define a guiding groove 1002, and the guiding groove 1002 is configured for passage of the cutting tool 9. Specifically, the height-limiting platform 1001 extends horizontally, and the guiding groove 1002 also extends horizontally and penetrates the second support member 12. When cutting food, a handle side of the cutting tool 9 is placed on the guiding face 1000 of the first support member 11, a tip of the cutting tool 9 passes through the guiding groove 1002 and is placed on the guiding face 1000 of the second support member 12. The height-limiting platform 1001 is configured to limit a height of the tip of the cutting tool 9 during the cutting process, preventing the cutting tool 9 from tilting too much and ensuring that the sliced food is flat. In some embodiments, a width K of the guiding groove 1002 is less than 1 cm, particularly 0.5 cm.

In some embodiments, each of the first support member 11 and the second support member 12 defines the first positioning portion 101, the second positioning portion 102, the third positioning portion 103, and the fourth positioning portions 104. A height of the first positioning portion 101 of the first support member 11 corresponds to a height of the first positioning portion 101 of the second support member 12, a height of the second positioning portion 102 of the first support member 11 corresponds to a height of the second positioning portion 102 of the second support member 12, a height of the third positioning portion 103 of the first support member 11 corresponds to a height of the third positioning portion 103 of the second support member 12, and a height of the fourth positioning portion 104 of the first support member 11 corresponds to a height of the fourth positioning portion 104 of the second support member 12. One group of positioning structure 10 consists of one first positioning portion 101, one second positioning portion 102, one third positioning portion 103, one fourth positioning portion 104, and one vertical groove 105 in a same support member, and each of the first support member 11 and the second support member 12 is arranged with two groups of positioning structures 10.

In other embodiments, the number of positioning portions included in each group of positioning structure 10 can also be inconsistent. For example, one group of positioning structure 10 only includes the first positioning portion 101 and the second positioning portion 102, and another group of positioning structure 10 includes the first positioning portion 101, the second positioning portion 102, the third positioning portion 103, and the fourth positioning portion 104, which is not shown in the drawings.

Figure 2:
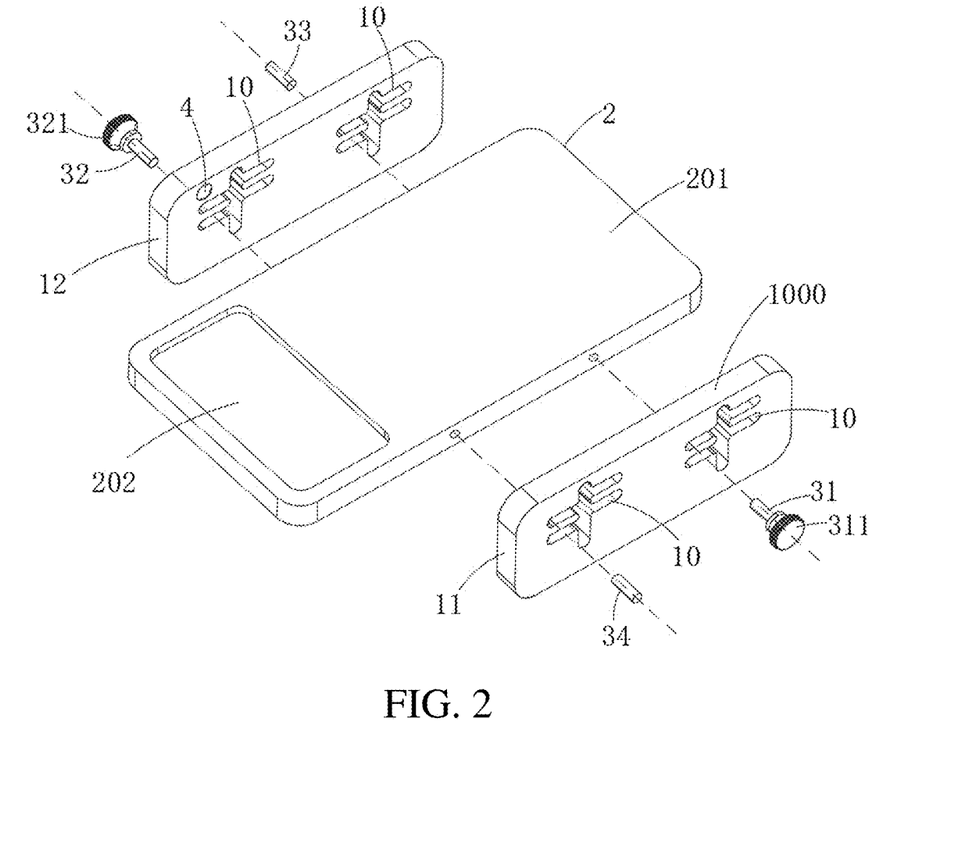
FIG. 2 is an exploded view of the food slicing rack according to an embodiment of the present disclosure.

Referring to FIG. 2, the at least one support shaft 3 includes a first support shaft 31, a second support shaft 32, a first auxiliary shaft 33, and a second auxiliary shaft 34. It should be noted that, each of the first support shaft 31, the second support shaft 32, the first auxiliary shaft 33, and the second auxiliary shaft 34 is configured as one support shaft 3. Each of the first support shaft 31 and the second support shaft 32 is mounted on the receiving plate 2. The first support shaft 31 is capable of passing through the first positioning portion 101, the second positioning portion 102, the third positioning portion 103, the fourth positioning portion 104, or the vertical groove 105 of the first support member 11. The second support shaft 32 is capable of passing through the first positioning portion 101, the second positioning portion 102, the third positioning portion 103, the fourth positioning portion 104, or the vertical groove 105 of the second support member 12. The first support shaft 31 and the second support shaft 32 are spaced apart from each other in a length direction of the receiving plate 2.

The first auxiliary shaft 33 is arranged coaxially with the first support shaft 31, the first auxiliary shaft 33 is located on a side of the receiving plate 2 away from the first support shaft 31. The first support shaft 31 is connected to the first support member 11 at one of the two groups of positioning structures 10 of the first support member 11, and the first auxiliary shaft 33 is connected to the second support member 12 at one of the two groups of positioning structures 10 of the second support member 12. The second auxiliary shaft 34 is arranged coaxially with the second support shaft 32. The second auxiliary shaft 34 is located on a side of the receiving plate 2 away from the second support shaft 32. The second support shaft 32 is connected with the second support member 12 at the other of the two groups of positioning structures 10 of the second support member 12, and the second auxiliary shaft 34 is connected with the first support member 11 at the other of the two groups of positioning structures 10 of the first support member 11. In this embodiment, four support shafts 3, which includes the first support shaft 31, the second support shaft 32, the first auxiliary shaft 33, and the second auxiliary shaft 34, are used to connect the receiving plate 2, the first support member 11, and the second support member 12 together, making the receiving plate 2 and the frame 1 more stable during use, preventing the frame 1 from shaking and affecting user's cutting of food.

Each of two sides of the receiving plate 2 defines two mounting holes, the four mounting holes are configured for mounting of the first support shaft 31, the second support shaft 32, the first auxiliary shaft 33, and the second auxiliary shaft 34, that is, each of the first support shaft 31, the second support shaft 32, the first auxiliary shaft 33, and the second auxiliary shaft 34 can be inserted or embedded into a corresponding one of the four mounting holes.

In some embodiments, the aforementioned locking tool consists of the first support shaft 31 and the second support shaft 32. Specifically, each of the first support shaft 31 and the second support shaft 32 is arranged with threads and threadedly connected to the receiving plate 2 at a corresponding mounting hole. An end of the first support shaft 31 away from the receiving plate 2 is arranged with a first rotating portion 311. When the user rotates the first rotating portion 311 in a forward direction, the first rotating portion 311 can be driven to approach the first support member 11, such that the first rotating portion 311 and the receiving plate 2 can cooperatively clamp the first support member 11. When the user rotates the first rotating portion 311 in a reverse direction, the first rotating portion 311 can be driven to move away from the first support member 11, allowing the first support shaft 31 to be adjusted in position. Similarly, an end of the second support shaft 32 away from the receiving plate 2 is arranged with a second rotating portion 321. When the user rotates the second rotating portion 321 in the forward direction, the second rotating portion 321 can be driven to approach the second support member 12, such that the second rotating portion 321 and the receiving plate 2 can cooperatively clamp the second support member 12. When the user rotates the second rotating portion 321 in the reverse direction, the second rotating portion 321 can be driven to move away from the second support member 12, allowing the second support shaft 32 to be adjusted in position. Therefore, when adjusting the height of the receiving plate 2, the user needs to simultaneously rotate the first rotating portion 311 and the second rotating portion 321 in the reverse direction, and after the receiving plate 2 is adjusted to a specified height, simultaneously rotate the first rotating portion 311 and the second rotating portion 321 in the forward direction to fix the position of the receiving plate 2.

In some embodiments, as shown in FIGS. 1, 7, 8, and 9, the receiving face 201 further defines a debris collection groove 202. The debris collection groove 202 is configured to collect debris generated during the cutting process of the food, reducing waste of food.

A length of the receiving plate 2 is greater than a length of the frame 1, and an end of the receiving plate 2 protrudes from the frame 1 and forms a protruding portion 21. The debris collection groove 202 is defined by the protruding portion 21, facilitating collection and centralized disposal of debris.

In some embodiments, as shown in FIGS. 1, 8, 9, and 10, a side of the frame 1 facing the receiving plate 2 is arranged with at least one magnetic member 4. The at least one magnetic member 4 is configured to adsorb the cutting tool 9. The at least one magnetic member 4 is mounted on at least one of the first support member 11 and the second support member 12. Particularly, the number of the at least one magnetic member 4 is two. One of the two magnetic members 4 is mounted at a front end of the height-limiting platform 1001 and the other of the two magnetic members 4 is mounted at a rear end of the height-limiting platform 1001.

Figure 12:
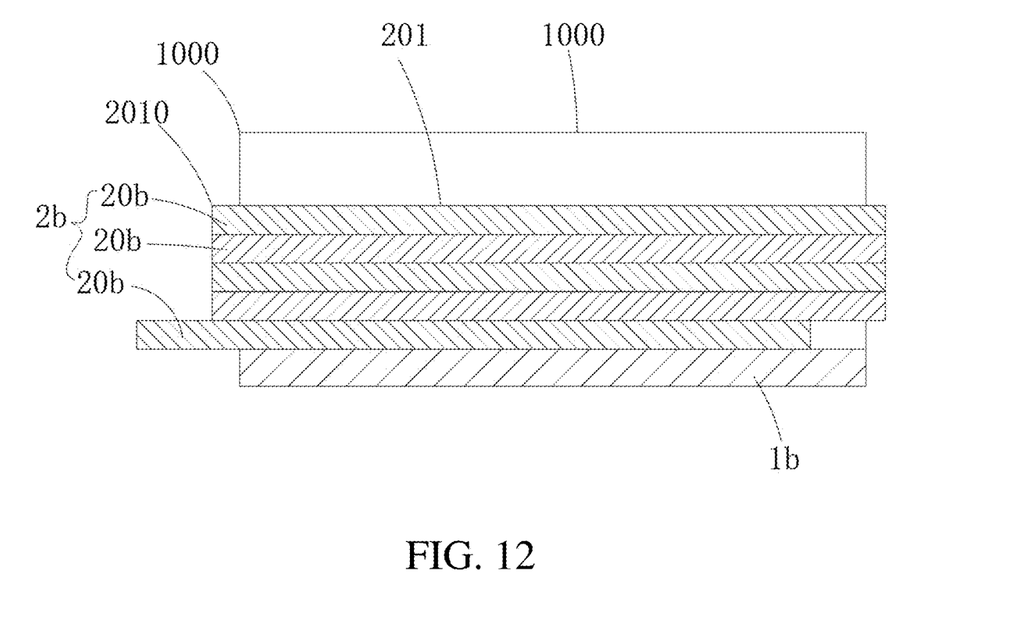
FIG. 12 is a schematic view of height adjustment of a receiving face according to a further another embodiment of the present disclosure.

In addition, regarding the height adjustment of the receiving face 201, in other embodiments, the food slicing rack includes a frame 1b and a receiving plate 2b. The frame 1b is arranged in a "U" shape, the receiving plate 2b is located in the middle of the frame 1b, and the guiding face 1000 is located on the frame 1b. The receiving plate 2b can also be divided into a plurality of plates 20b, the plurality of plates 20b can be stacked vertically, and a top face of one of the plurality of plates 20b which is at the top is used as the receiving face 201. The height of the receiving face 201 can be adjusted according to the number of the plurality of plates 20b stacked, as shown in FIG. 12, which is a vertical cross-sectional view of this embodiment.

Figure 13:
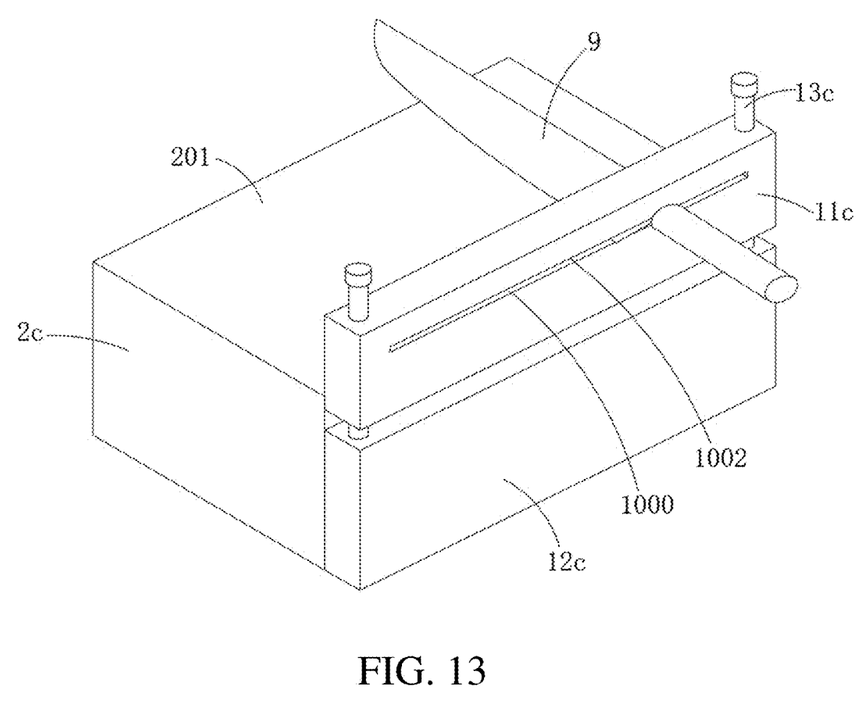
FIG. 13 is a schematic view of height adjustment of the guiding face according to a further embodiment of the present disclosure.

In another embodiment, as shown in FIG. 13, the frame 1c includes a first support member 11c and a base 12c. The first support member 11c is connected to the base 12c through two threaded columns 13c, allowing the first support member 11c to be adjusted in height relative to the base 12c. The first support member 11c is arranged with a guiding face 1000 and defines a guiding groove 1002. A cutting tool 9 can be inserted into the guiding groove 1002, a width of the guiding groove 1002 is similar to a thickness of the cutting tool 9. The receiving plate 2c is fixed beside the first support member 11c, a top face of the receiving plate 2c is the receiving face 201. In the present embodiment, the guiding face 1000 can be raised and lowered. In this way, the height difference between the guiding face 1000 and the receiving face 201 can also be adjusted. In summary, the present disclosure does not limit the height adjustment scheme.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A food slicing rack, comprising: at least one guiding face, wherein each of the at least one guiding face extends transversely and is configured to guide movement of a cutting tool; and a receiving face, extending transversely and configured to carry food thereon; wherein a height of the receiving face is lower than a height of the each of the at least one guiding face, wherein a height difference between the receiving face and the each of the at least one guiding face is adjustable the food slicing rack further comprises: a frame, wherein the at least one guiding face is arranged on the frame; and a receiving plate, mounted on the frame or located beside the frame, and displaceable in a height direction of the frame, wherein the receiving face is arranged on the receiving plate; and the frame has at least one first positioning portion and at least one second positioning portion, a height of each of at least one first positioning portion is different from a height of each of at least one second positioning portion, and a distance from the each of at least one first positioning portion to a respective one of the at least one guiding face is less than a distance from the each of at least one second positioning portion to a respective one of the at least one guiding face the food slicing rack further comprises at least one support shaft, each of the at least one support shaft is capable of being detachably mounted to the receiving plate at a respective one of the at least one first positioning portion or a respective one of the at least one second positioning portion, the receiving face of the receiving plate has a first height corresponding to the at least one first positioning portion, and the receiving face of the receiving plate has a second height corresponding to the at least one second positioning portion.

2. The food slicing rack as claimed in claim 1, wherein a highest point of the receiving face is lower than a lowest point of the each of the at least one guiding face.

3. The food slicing rack as claimed in claim 1, wherein each of the at least one first positioning portion and the at least one second positioning portion is a groove.

4. The food slicing rack as claimed in claim 3, wherein the frame further defines at least one vertical groove, the each of the at least one first positioning portion and the at least one second positioning portion extends transversely, the each of the at least one vertical groove extends vertically, and the each of the at least one vertical groove is communicated with a respective one of the at least one first positioning portion and a respective one of the at least one second positioning portion; a height of a bottom end of the each of at least one the vertical groove is less than a height of the respective one of the at least one second positioning portion, the each of the at least one support shaft is capable of passing through the respective one of the at least one first positioning portion, the respective one of the at least one second positioning portion, or a respective one of the at least one vertical groove, each of the at least one support shaft is capable of abutting against the frame at any position around the respective one of the at least one first positioning portion, at any position around the respective one of the at least one second positioning portion, or at the bottom end of the respective one of the at least one vertical groove, and the receiving face of the receiving plate has a fifth height position corresponding to the bottom end of the each of the at least one vertical groove.

5. The food slicing rack as claimed in claim 4, wherein the frame further has at least one third positioning portion and at least one fourth positioning portion, a height of each of the at least one third positioning portion is different from a height of each of the at least one fourth positioning portion, and each of the at least one support shaft is capable of being detachably mounted to the frame at a respective one of the at least one third positioning portion or at a respective one of the at least one fourth positioning portion; the number of the at least one vertical groove is one, the one vertical groove is communicated with the respective one of the at least one first positioning portion, the respective one of the at least one second positioning portion, a respective one of the at least one third positioning portion, and a respective one of the at least one fourth positioning portion, and the receiving face of the receiving plate has a third height corresponding to the at least one third positioning portion and has a fourth height corresponding to the at least one fourth positioning portion.

6. The food slicing rack as claimed in claim 3, wherein the frame has at least two groups of positioning structures, each of the at least two groups of positioning structures consists of one of the at least one first positioning portion and one of the at least one second positioning portion, and the number of the at least one support shaft corresponds to the number of the at least two groups of positioning structures.

7. The food slicing rack as claimed in claim 1, wherein each of the at least one guiding face and the receiving face is horizontally disposed.

8. The food slicing rack as claimed in claim 1, wherein the number of the at least one guiding face is at least two, the at least two guiding faces are at a same height, and the receiving plate is located between two of the at least two guiding faces.

9. The food slicing rack as claimed in claim 8, wherein the frame is arranged with a height-limiting platform at one of the at least two guiding faces, the height-limiting platform extends transversely, the height-limiting platform and the one of the at least two guiding faces cooperatively define a guiding groove, and the guiding groove is configured for passage of the cutting tool.

10. The food slicing rack as claimed in claim 1, wherein the frame comprises a first support member and a second support member, the receiving plate is mounted between the first support member and second support member, at least one of the first support member and second support member is arranged with the at least one guiding face.

11. The food slicing rack as claimed in claim 10, wherein the number of the at least one guiding face is two, the first support member is arranged with one of the two guiding faces, the second support member is arranged with the other of the two guiding faces, and the two guiding faces are at the same height and flush with each other.

12. The food slicing rack as claimed in claim 10, wherein each of the first support member and second support member has the at least one first positioning portion and the at least one second positioning portion, a height of each of the at least one first positioning portion of the first support member corresponds to a height of each of the at least one first positioning portion of the second support member, and a height of each of the at least one second positioning portion of the first support member corresponds to a height of each of the at least one second positioning portion of the second support member, and a distance from each of the at least one first positioning portion to a respective one of the at least one guiding face is less than a distance from at least one of the at least one second positioning portion to the respective one of the at least one guiding face; wherein the at least one support shaft is a first support shaft and a second support shaft, each of the first support shaft and second support shaft is mounted on the receiving plate, the first support shaft is capable of passing through the at least one first positioning portion or the at least one second positioning portion of the first support member, the second support shaft is capable of passing through the at least one first positioning portion or the at least one second positioning portion of the second support member, and the receiving face on the receiving plate has the first height corresponding to the at least one first positioning portion and the second height corresponding to the at least one second positioning portion.

13. The food slicing rack as claimed in claim 12, wherein the first support shaft and second support shaft are spaced apart from each other in a length direction of the receiving plate.

14. The food slicing rack as claimed in claim 13, wherein each of the first support member and second support member is arranged with two groups of positioning structures, and each of the two groups of positioning structures consists of one of the at least one first positioning portion and one of the at least one second positioning portion; the first support shaft is connected to the first support member at one of the two groups of positioning structures of the first support member, and the second support shaft is connected to the second support member at one of the two groups of positioning structures of the second support member; the food slicing rack further comprises a first auxiliary shaft and a second auxiliary shaft, the first auxiliary shaft is arranged coaxially with the first support shaft, the first auxiliary shaft is located on a side of the receiving plate away from the first support shaft, and the first auxiliary shaft is connected to the second support member at the other of the two groups of positioning structures of the second support member; the second auxiliary shaft is arranged coaxially with the second support shaft, the second auxiliary shaft is located on a side of the receiving plate away from the second support shaft, and the second auxiliary shaft is connected to the first support member at the other of the two groups of positioning structures of the first support member.

15. The food slicing rack as claimed in claim 14, wherein each of the first support shaft and second support shaft is arranged with threads and is threadedly connected to the receiving plate; an end of the first support shaft away from the receiving plate is arranged with a first rotating portion, and the first rotating portion and the receiving plate are capable of cooperatively clamping the first support member; an end of the second support shaft away from the receiving plate is arranged with a second rotating portion, and the second rotating portion and the receiving plate are capable of cooperatively clamping the second support member.

16. The food slicing rack as claimed in claim 1, wherein the receiving face defines a debris collection groove.

17. The food slicing rack as claimed in claim 1, wherein a side of the frame facing the receiving plate is arranged with a magnetic member, and the magnetic member is configured to adsorb the cutting tool.

* * * * *